(12) United States Patent
Romero

(10) Patent No.: US 7,374,135 B2
(45) Date of Patent: May 20, 2008

(54) METHOD AND APPARATUS FOR COLLECTING YARD DEBRIS

(75) Inventor: Melanie J. N. Romero, 3605 Merrell Rd., Dallas, TX (US) 75229

(73) Assignee: Melanie J. N. Romero, Dallas, TX (US)

( * ) Notice: Subject to any disclaimer, the term of this patent is extended or adjusted under 35 U.S.C. 154(b) by 26 days.

(21) Appl. No.: 11/403,571

(22) Filed: Apr. 13, 2006

(65) Prior Publication Data

US 2007/0246617 A1    Oct. 25, 2007

(51) Int. Cl.
*B65B 67/04* (2006.01)

(52) U.S. Cl. .......................................... 248/99; 248/95

(58) Field of Classification Search ................. 248/95, 248/99, 101; 15/257.1, 257.3
See application file for complete search history.

(56) References Cited

U.S. PATENT DOCUMENTS

| | | | |
|---|---|---|---|
| 4,548,372 A | | 10/1985 | Lutzker |
| 4,951,903 A | * | 8/1990 | Frey .............................. 248/99 |
| 4,971,274 A | | 11/1990 | Mitchell |
| 5,009,378 A | * | 4/1991 | Linsmeyer et al. ............ 248/99 |
| 5,050,920 A | * | 9/1991 | Potticary ..................... 294/55 |
| D324,441 S | * | 3/1992 | Werner .......................... D34/5 |
| 6,276,645 B1 | | 8/2001 | Chang |
| 6,471,267 B2 | * | 10/2002 | Asazuma ..................... 294/1.5 |
| 6,488,242 B1 | * | 12/2002 | Barriere ....................... 248/99 |
| 6,604,716 B1 | | 8/2003 | Hoey |
| 6,942,264 B1 | * | 9/2005 | Mendez ...................... 294/1.5 |
| 2002/0038956 A1 | * | 4/2002 | Ditzik ......................... 294/1.4 |

OTHER PUBLICATIONS

Alco Mfg, Inc., "Big Mouth Portable Trash/Leaf Bag System"; 2004; Alco Manufacturing, Inc., New Iberia, LA (http://www.alcomfg.com/bigmouth).
Bagmaster, "The BagMaster abd Nifty Nabber—Number one in lawn care!"; BagMaster, Greenville, SC (http://www.bagholders/net).
Changer Products, "Changer Products Inc.—Manufacturer of Innovative Products"; Changer Products Inc., Ontario, Canada (http://www.changerproducts.com/catalogue).

* cited by examiner

*Primary Examiner*—Amy J. Sterling
(74) *Attorney, Agent, or Firm*—Carr LLP

(57) ABSTRACT

An apparatus for collecting leaves and other yard debris supports a flexible bag in an open configuration. The apparatus has a frame for supporting the flexible bag, and a retaining element for securing the flexible bag to the frame. A handle can be attached to the frame. The apparatus can be used as a tool to collect leaves or other yard debris directly. The frame can have a shape that defines an opening through which the flexible bag is draped. The shape of the frame can have at least one substantially straight side.

17 Claims, 6 Drawing Sheets

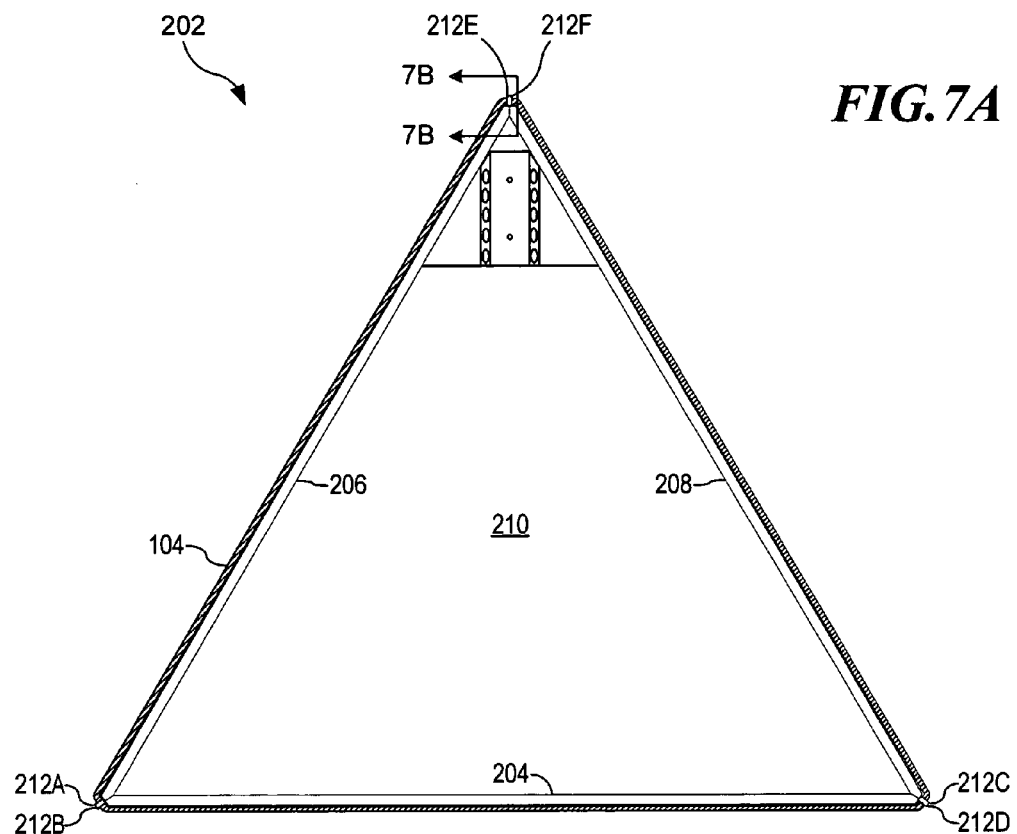
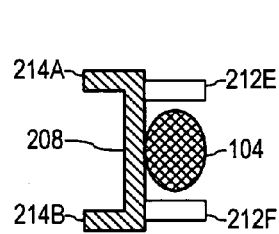
FIG.7B
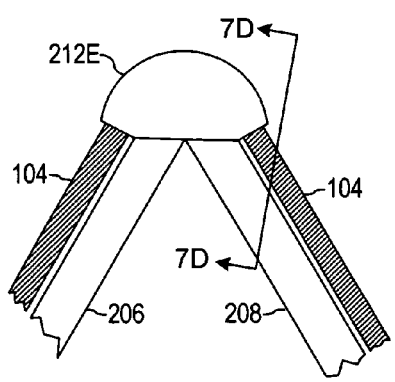
FIG.7A
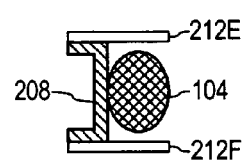
FIG.7D
FIG.7C

US 7,374,135 B2

METHOD AND APPARATUS FOR COLLECTING YARD DEBRIS

FIELD OF THE INVENTION

The invention relates to lawn and garden tools and, more particularly, to an apparatus and method for using bags.

DESCRIPTION OF THE RELATED ART

Bags are used for a variety of purposes, including storage, transport and disposal of both valued and waste items. For example, bags are commonly used to collect and dispose of leaves accumulating on lawns and in gardens. Many home owners use a leaf rake to gather the leaves into piles and then collect the leaves into bags for disposal. Plastic bags are widely used for storage, transport and disposal purposes, including the collection and disposal of leaves and other yard debris. Perhaps the most commonly used plastic bags are 39-gallon "lawn & leaf" bags.

However, plastic or other flexible bags generally will not support themselves in an open configuration, making such bags awkward to use and difficult to fill.

Therefore, a need exists for an apparatus and method for handling bags when in use.

SUMMARY OF THE INVENTION

At least some of the foregoing difficulties are addressed by an apparatus supporting a flexible bag in an open configuration. The apparatus has a frame for supporting the flexible bag, and a retaining element for securing at least a portion of the flexible bag to the frame. A handle can be attached to the frame. The apparatus can be used as a tool to collect leaves or other items. The frame can have a shape that defines an opening through which the flexible bag extends. The shape of the frame can have at least one substantially straight side.

BRIEF DESCRIPTION OF THE DRAWINGS

For a more complete understanding of the present invention and the advantages thereof, reference is now made to the following descriptions taken in conjunction with the accompanying drawings, in which:

FIGS. 7A-7D depict a frame according to another aspect of the invention;

DETAILED DESCRIPTION

In the following discussion, numerous specific details are set forth to provide a thorough understanding of the present invention. However, those skilled in the art will appreciate that the present invention may be practiced without such specific details.

Figure 1:
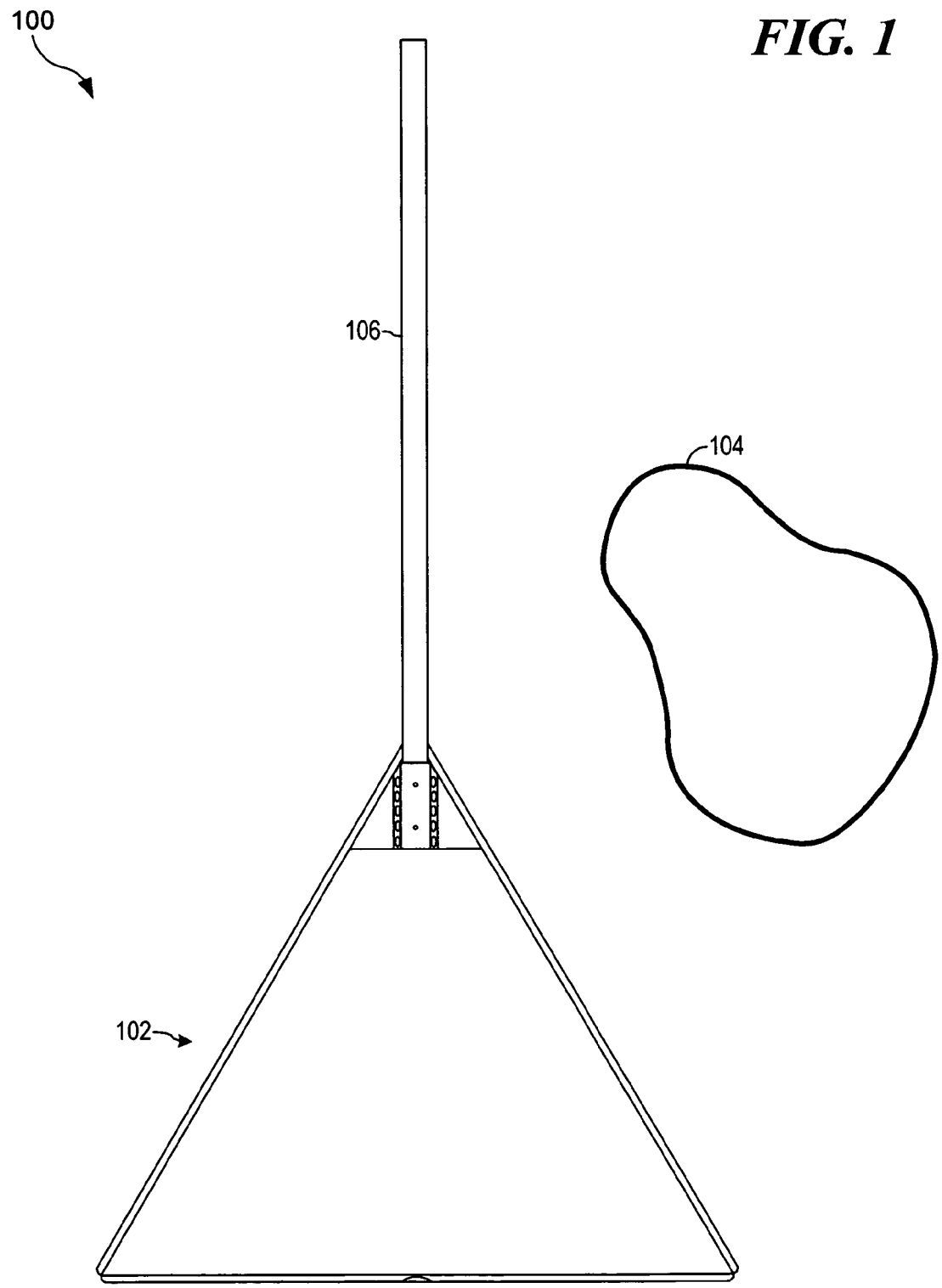
FIG. 1 is a plan view depicting an apparatus for collecting yard debris in accordance with an aspect of the present invention.

Referring to FIG. 1 of the drawings, the reference numeral 100 generally designates an apparatus for collecting yard debris in accordance with an aspect of the present invention. In some embodiments, the apparatus 100 comprises a frame 102 for supporting a flexible bag (not shown), an elastic retainer 104 for securing the bag to the frame 102, and a handle 106. In certain embodiments, the perimeter of the frame 102 defines a triangular shape that mimics the natural shape the perimeter of a disposable plastic bag assumes when a person tries to hold such a bag open using their feet and one hand. The frame 102 having a triangular shape is strong, provides a secure three-point hold on the bag thereby supplementing the action of the elastic retainer 104, and closely matches the shape of most leaf rakes and many brooms.

Figure 2:
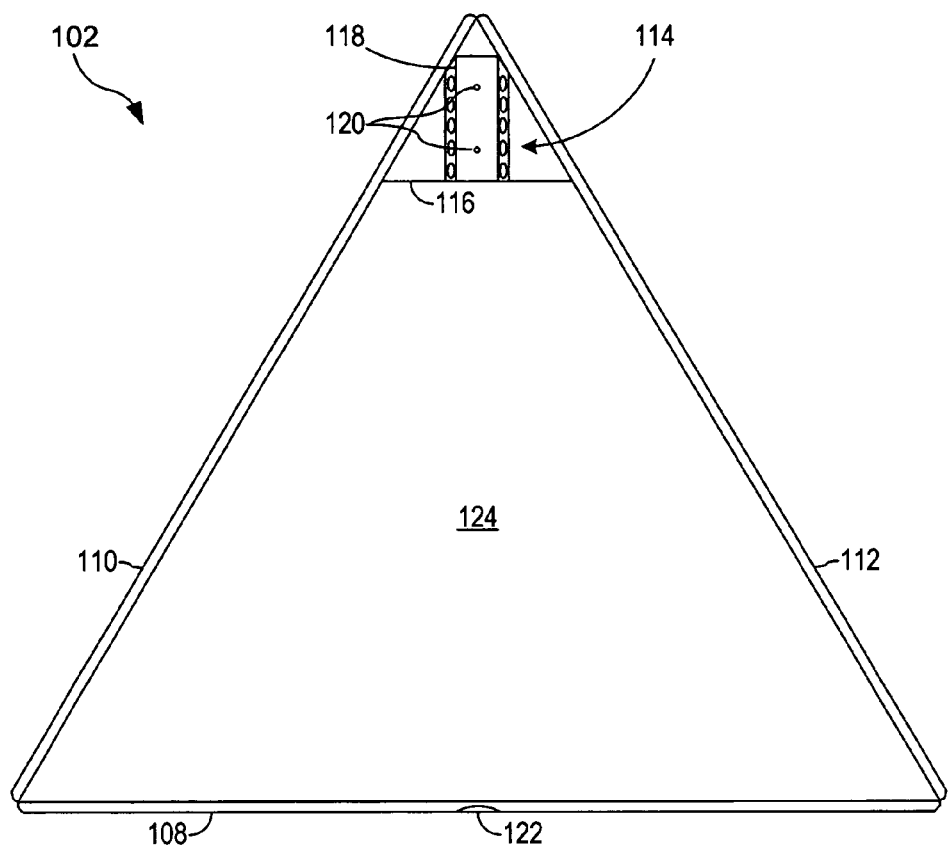
FIG. 2 is a plan view depicting a frame for holding a flexible waste collection bag.

Referring now to FIG. 2, the frame 102 comprises a leading edge member 108, a first supporting member 110, a second supporting member 112, and a yoke 114. In an embodiment, the frame 102 is fabricated from sheet metal such as 18 gauge cold-rolled steel, although other suitably strong steel, plastic or composite materials can also be used. Each member 108, 110, 112 of the frame 102 can be joined end-to-end to each other member to form a substantially equilateral triangle. Alternatively, the frame 102 can be constructed of a single supporting member bent in two places and joined together at the ends. The length of each member 108, 110, 112 is carefully chosen to provide a perimeter that fits commonly used plastic lawn and leaf bags in the range of 30-gallon and up. In an embodiment, each leg 108, 110, 112 is approximately 21.7 inches (55 cm) long so that the perimeter of the frame 102 is approximately 65 inches (165 cm). In an embodiment sized to fit a bag of a particular capacity, such as a 30-gallon bag, larger capacity bags can be easily accommodated by gathering the open end of the larger bag, draped over the frame 102, into pleats or otherwise, around the frame and securing the open end to the frame 102 with the elastic retainer 104. Alternatively, the lengths of the members 108, 110, 112 can be shorter or longer to provide a shorter or longer perimeter for use with smaller- or larger-capacity bags. Smaller capacity bags, such as common, plastic grocery store bags, for example, or small-capacity trash bags in the range of 7-gallon to 13-gallon capacity, for example, can be secured to a smaller frame and used as a "pooper scooper" for gathering pet excrement, cleaning smaller areas and the like.

In some embodiments the yoke 114 can be coupled to one corner of the frame 102, and comprises a yoke plate 116 supporting a handle receptacle 118. The yoke plate 116 can be a generally triangular plate coupled to two adjacent supporting members 110, 112, and fabricated from the same material as the members 108, 110, 112. The receptacle 118 can be coupled to the yoke plate 116 and to adjacent supporting members 110, 112. The receptacle 118 defines a generally cylindrical interior volume for receiving a generally cylindrical handle. In an embodiment, the handle can be made of wood and secured to the receptacle using threaded fasteners (not shown) inserted through attachment holes 120 formed in the receptacle 118. Alternatively, the handle receptacle 118 can be threaded to receive a threaded end of a wooden or metal handle, or some other attachment means can be utilized.

To aid the installation and removal of the elastic retainer 104, a crescent-shaped cutout 122 can be formed in the leading edge member 108. As will be described in more detail hereinafter, the members 108, 110, 112 can be formed as channels having opposing flanges for capturing the elastic retainer 104 therebetween. The crescent-shaped cutout 122 can be formed or cut into at least one of such flanges. The members 108, 110, 112 define an open space 124 inside the triangular frame 102, according to an aspect of the present invention.

Figure 3:
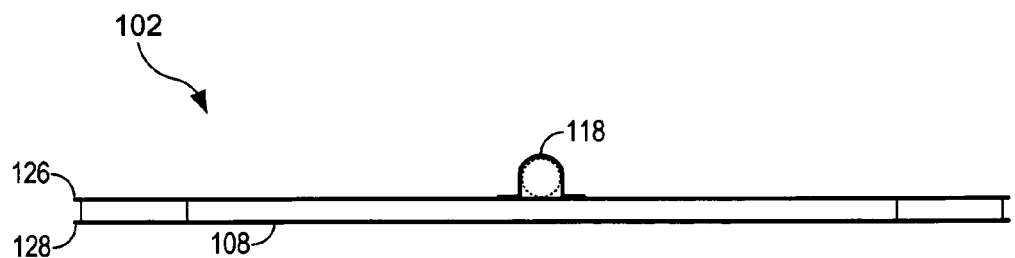
FIG. 3 is an end elevation depicting a frame for holding a flexible waste collection bag.

Turning now to FIG. 3, the leading edge member 108 exemplifies a general shape of one embodiment of members 108, 110, 112, as channels having opposing flanges 126, 128 extending outwardly from the frame 102 and configured to retain the elastic retainer 104 therebetween. Handle receptacle 118 enclosing a generally cylindrical volume for receiving a generally cylindrical handle.

Figure 4:
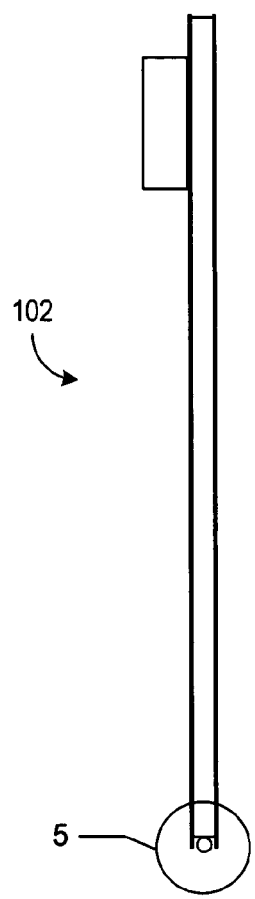
FIG. 4 is a side elevation depicting a frame for holding a flexible waste collection bag.
Figure 5:
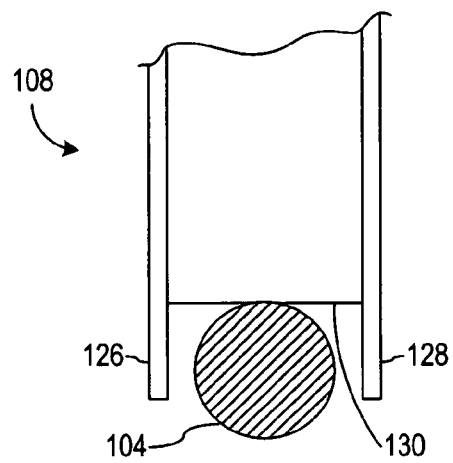
FIG. 5 is a detail of the area within circle 5 in FIG. 4.

Turning now to FIG. 4 and to FIG. 5, the general shape of members 108, 110, 112 is shown in more detail, according to one aspect of the present invention. As shown in FIG. 5, elastic retainer 104 rests upon a generally flat surface 130 between opposing flanges 126, 128 of an exemplary member 108 having a U-shaped channel.

Figure 6A:
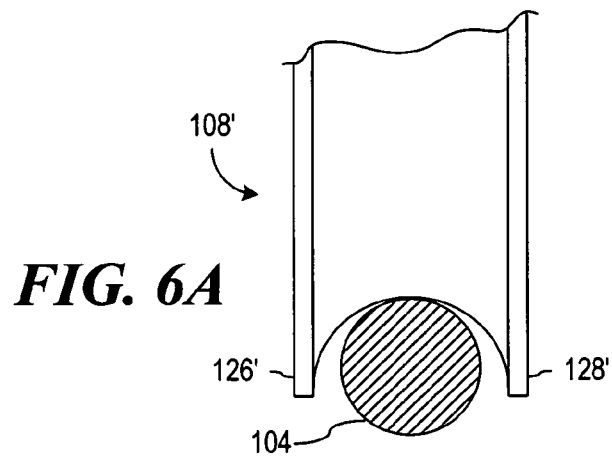
FIGS. 6A-6B are details of alternate profiles of the area shown in FIG. 5.
Figure 6B:
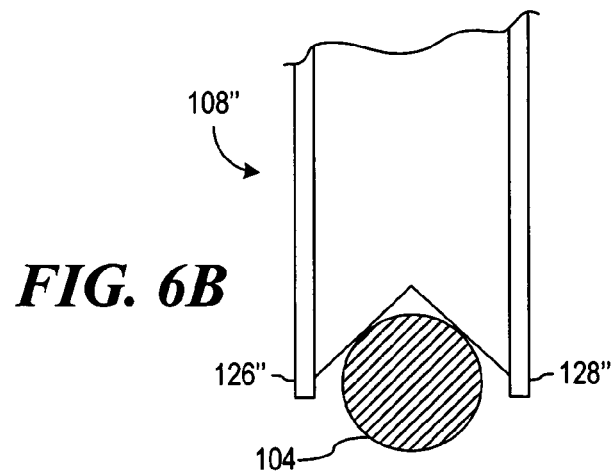

Turning now to FIGS. 6A-6B, an alternative exemplary member 108' supports elastic retainer 104 upon a radiused surface 130' between opposing flanges 126' and 128' defining a C-shaped channel. An alternative exemplary member 108" supports elastic retainer 104 upon a bi-planar surface 130" between opposing flanges 126" and 128" defining a V-shaped channel.

Turning now to FIG. 7A, a frame 202 according to another aspect of the present invention comprises a first side 204, a second side 206, and a third side 208, connected end-to-end and defining an opening 210 for receiving an open end of a bag. The frame 202 further comprises one or more retaining surfaces 212A-212F extending outwardly from the frame 202 and configured to retain an elastic loop 104 stretched to fit around a perimeter of the frame 202. A yoke 214 can be mounted to one corner of the frame 202 and configured to receive a handle.

Turning now to FIG. 7B, one side 208 of frame 202 is depicted in cross-section, wherein the sides 204, 206, 208 of frame 202 can be formed as U-shaped channels having flanges 214A-B extending inwardly from the frame 202 and configured to reinforce or stiffen the sides 204, 206, 208. Retaining surfaces 212A-212B can be located at the corners of frame 202, in pairs spaced apart to receive elastic retainer 104 between the pairs of retaining surfaces 212A-212B, 212C-212D, and 212E-212F. The retaining surfaces 212A-212F can be posts affixed to or integral with the sides 204-208, located proximal to upper and lower edges of each side 204-208 to reduce a tendency for the elastic retainer 104 to slip off the frame 202. Referring now to FIG. 7C, the retaining surfaces 212A-212F can also be plates affixed to the corners of frame 202, extending outwardly from the frame 202 and proximal to upper and lower edges of each side 204-208, as shown for example in FIGS. 7C-7D. FIG. 7D depicts side 208 of frame 202 in cross-section, in which retaining surfaces 212C-212D can be affixed to or integral with the side 208 and proximal to upper and lower edges thereof, spaced apart to receive the elastic retainer 104 therebetween.

In other embodiments of the present invention, the frame 102/202 can define other shapes such as a square, pentagon, hexagon, circle, oval, or an irregular shape. A frame formed in any of the aforementioned shapes can be provided with retaining surfaces for capturing or retaining a bag-clamping element, such as the elastic retainer 104, and a feature such as yoke 114 suitable for attaching a handle 106.

Figure 8A:
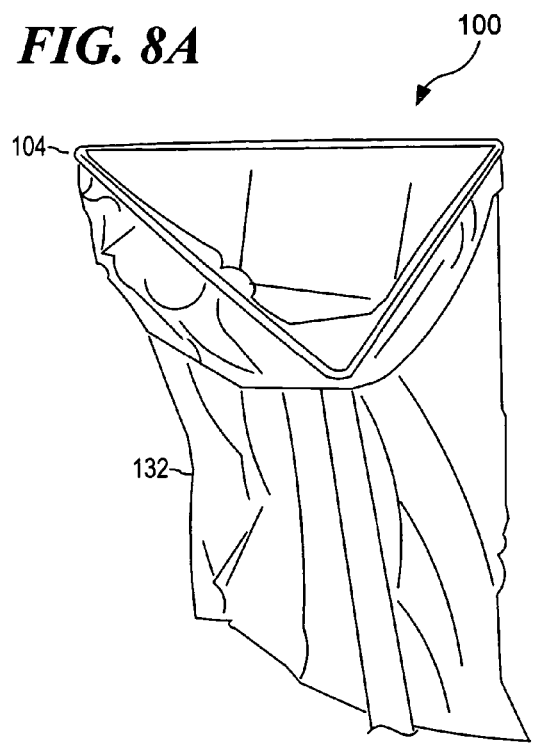
FIGS. 8A-8B are perspective views of the apparatus for collecting yard debris holding a flexible waste collection bag.
Figure 8B:
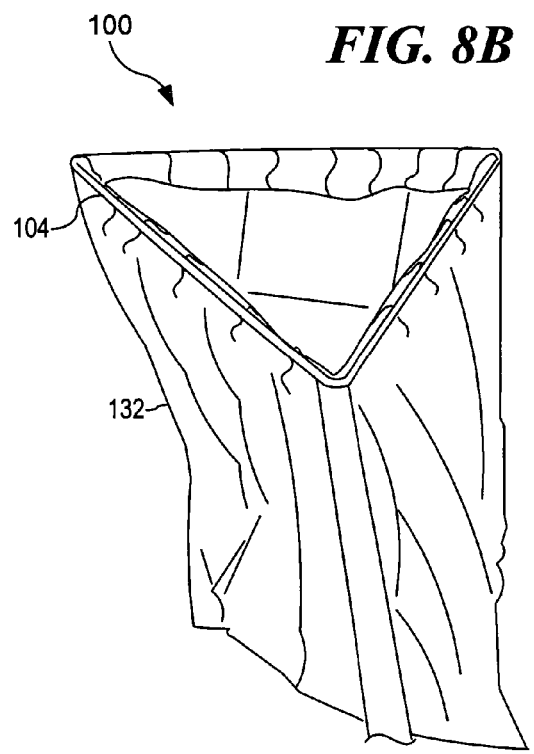

Turning now to FIGS. 8A-8B, the apparatus 100 can be used with a flexible plastic bag 132, which can be installed upon the frame 102 by passing the bag 132 through the frame, draping the top, open end of the bag over the frame 102 or 202, and securing the bag to the frame 102/202 with elastic retainer 104. The bag 132 should overlap the sides of frame 102 by 2-3 inches (5.0-7.5 cm). As shown in FIG. 8A, the top, open end of the bag 132 overlaps the outside of the frame 102/202, but the bag 132 can also be installed from the outside of the frame 102/202 with the top, open end overlapping inside the frame 102/202 as shown in FIG. 8B. The elastic retainer can be placed along one of the sides of frame 102/202, around two corners at either end of the one side, and stretched to fit around the remaining corner and along the two remaining sides. The elastic retainer installed as described captures the open end of the bag 132 between the retainer 104 and the channels of frame 102 or the posts 212A-212F of frame 202. With the bag 132 securely retained against frame 102/202, the apparatus 100 can be used to collect leaves or other yard debris using one or more of several different methods.

Figure 9:
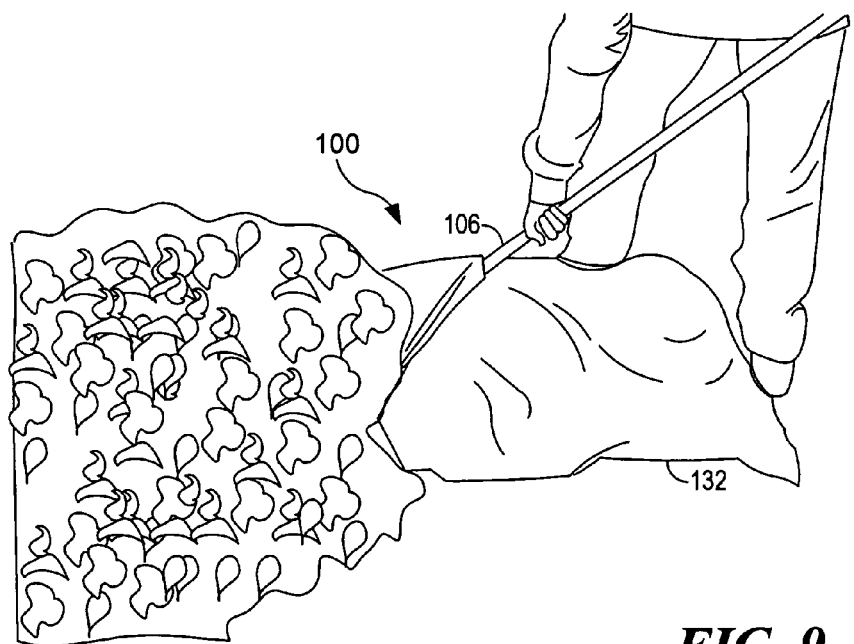
FIG. 9 is a perspective view of the apparatus for collecting yard debris being used in the shoveling method according to an aspect of the present invention.

Turning now to FIG. 9, the shovel method allows a user to collect yard debris directly, filling a significant portion of the bag 132 in one scoop. Grasping the handle 106 with both hands, and placing the frame 102/202 so that leading edge member 108/204 contacts the ground, a user urges the apparatus 100 forward as if using a shovel, to scoop leaves or other yard debris directly into the bag 132. This method significantly speeds the process of collecting yard debris, and significantly reduces repetitive bending, twisting, and stooping. The shoveling motion is familiar to people because most people have used a shovel or at least has seen a shovel used before.

Figure 10:
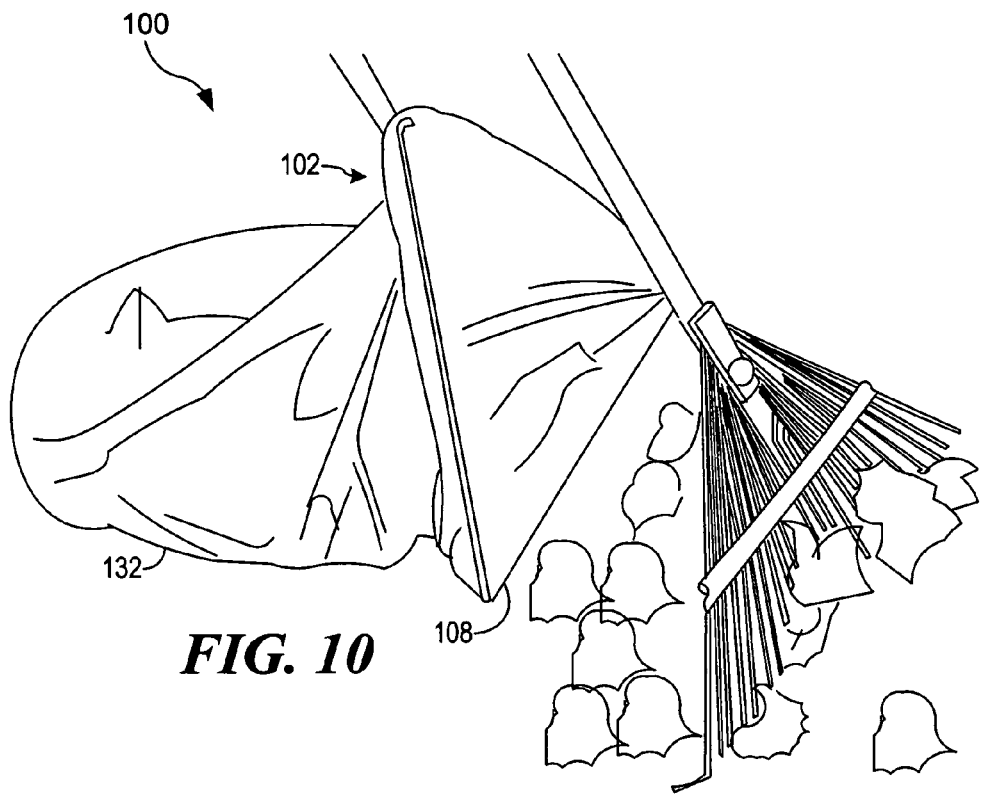
FIG. 10 is a perspective view of the apparatus for collecting yard debris being used in the dust-pan method according to an aspect of the present invention.

Turning now to FIG. 10, the dust-pan method can be used to fill the bag 132 with the aid of a rake or broom. Grasping the handle 106 with one hand, and placing the frame 102/202 so that leading edge member 108/204 contacts the ground, a user grasps a rake, broom, or other implement in the other hand, and uses the other implement to direct leaves or other yard debris into the bag 132. The apparatus 100 provides a natural, flat leading edge easing the application of this method with a broom, rake or other implement. The dust-pan method is also familiar to people since most people have used a broom and dust pan at some time.

Figure 11:
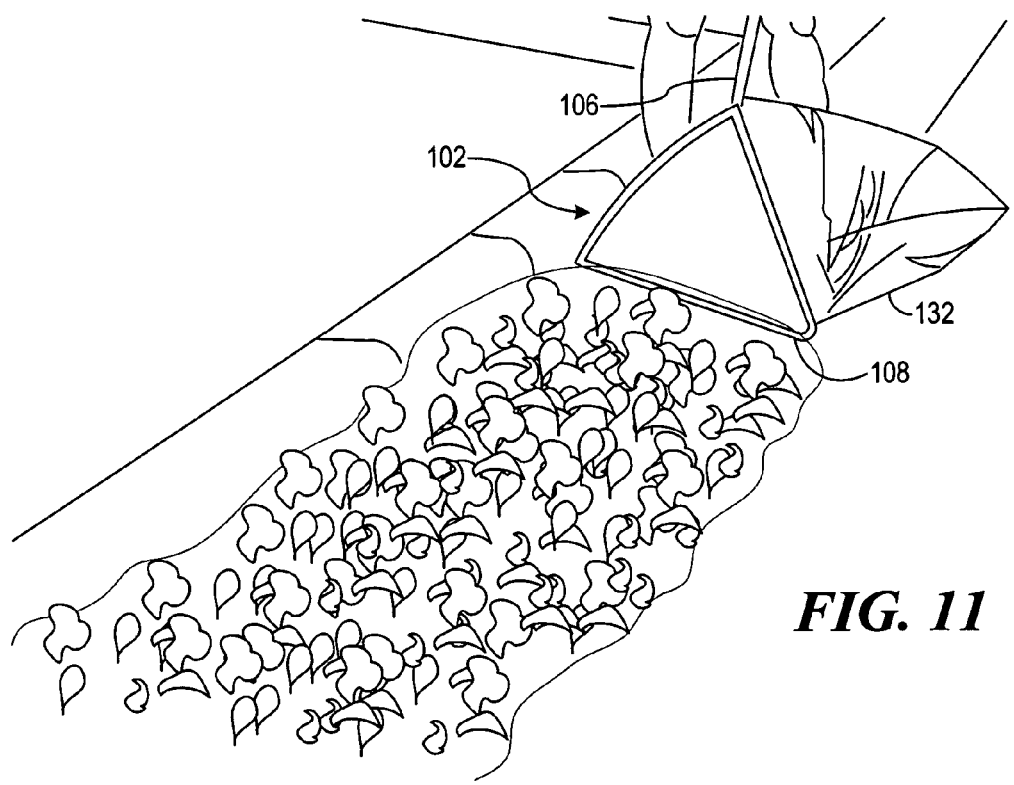
FIG. 11 is a perspective view of the apparatus for collecting yard debris being used in the curb-scraping method according to an aspect of the present invention.

Turning now to FIG. 11, the curb-scraping method can be used to fill the bag 132 by capturing leaves that have accumulated in gutters on the street, up against a curb. Grasping the handle 106 and placing the frame 102/202 so that leading edge member 108/204 contacts the pavement, a user pushes the apparatus 100 forward while keeping one corner in contact with the curb, scraping the curb to scoop leaves or other yard debris directly into the bag 132. The curb-scraping method reduces the need to rake leaves or other yard debris into piles and then bag the debris. Since leaves can tend to collect in gutters and pile up against a curb, the apparatus 100 can be used to collect these leaves directly into the bag 132.

It will further be understood from the foregoing description that various modifications and changes may be made in the preferred embodiment of the present invention without departing from its true spirit. This description is intended for purposes of illustration only and should not be construed in a limiting sense. The scope of this invention should be limited only by the language of the following claims.

The invention claimed is:

1. An apparatus for collecting yard debris, comprising:
a frame defining an opening for receiving an open end of a bag, wherein the frame comprises a first straight member defining at least a portion of the frame opening;
a closed loop of flexible material with an unstretched circumference smaller than a perimeter of the frame and configured to be secured about at least a portion of the perimeter separately from a bag and over at least a portion of the bag at least partially surrounding the perimeter;
one or more retaining surfaces extending from the frame and configured to retain the length of flexible material about the frame and the portion of the bag;
a handle secured to the frame and defining a longitudinal direction;
a support member secured to the frame at a plurality of locations spaced laterally relative to the handle, the support member extending across at least a portion of the frame opening, to structurally reinforce the frame; and
wherein the handle is coupled to the support member.

2. The apparatus of claim 1, wherein portions of the frame comprising the one or more retaining surfaces comprise at least a portion of one or more channel members configured to retain at least a portion of the length of flexible material.

3. The apparatus of claim 2, wherein a cross-section of at least a portion of the one or more channel members is generally U-shaped, C-shaped, V-shaped or concave.

4. The apparatus of claim 1, wherein portions of the frame comprising the one or more retaining surfaces comprise at least a portion of one or more channel members having an opening for receiving and retaining at least a portion of the length of flexible material extending along at least a portion of the one or more channel members.

5. The apparatus of claim 2, wherein the one or more channel members further comprise at least one cutout providing manual access to the loop secured about the frame.

6. The apparatus of claim 1, wherein the length of flexible material comprises an elastic cord.

7. The apparatus of claim 1, further comprising a handle coupled to the frame.

8. The apparatus of claim 7, wherein the handle is adjustable in length.

9. The apparatus of claim 1, wherein the frame further comprises a second straight member defining at least a portion of the opening.

10. The apparatus of claim 1, wherein the opening formed by the frame has a shape selected from the group consisting of a triangle, a quadrilateral, a pentagon, and a hexagon.

11. The apparatus of claim 1, wherein the closed loop of flexible material comprises a substantially circular cross-section.

12. The apparatus of claim 1, wherein the closed loop of flexible material is configured to be secured about the entire perimeter.

13. The apparatus of claim 1, wherein the frame is configured to retain the closed loop of flexible material around the entire perimeter.

14. The apparatus of claim 1, wherein the closed loop of flexible material is configured to be separable from the frame and the bag.

15. The apparatus of claim 1, further comprising a handle removably coupled to the receptacle.

16. The apparatus of claim 1, wherein the support member is coupled to at least two members of the frame, and wherein the members define an angle therebetween.

17. The apparatus of claim 1, wherein the support member comprises a triangular yoke, and wherein at least a portion of each of a plurality of sides of the yoke are coupled to one of a plurality of adjacent members of the frame.

* * * * *